(12) United States Patent
Karpenko

(10) Patent No.: US 11,835,105 B2
(45) Date of Patent: *Dec. 5, 2023

(54) COMPOSITE MATERIALS HAVING EMBEDDED METAL CABLES OR ROPES FOR INCREASED DAMPENING CAPACITY AND METHODS OF MANUFACTURING SAME

(71) Applicant: Ford Global Technologies, LLC, Dearborn, MI (US)

(72) Inventor: Yuri Anatoly Karpenko, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/339,329

(22) Filed: Jun. 4, 2021

(65) Prior Publication Data

US 2021/0293296 A1 Sep. 23, 2021

Related U.S. Application Data

(63) Continuation-in-part of application No. 16/702,426, filed on Dec. 3, 2019, now abandoned, and a (Continued)

(51) Int. Cl.
*F16F 7/02* (2006.01)
*F16F 15/02* (2006.01)
(Continued)

(52) U.S. Cl.
CPC .......... *F16F 7/02* (2013.01); *B29C 45/14549* (2013.01); *B29C 45/14631* (2013.01);
(Continued)

(58) Field of Classification Search
CPC .... F16F 7/02; F16F 1/366; F16F 15/02; F16F 2222/04; F16F 2224/0241; F16F 7/14;
(Continued)

(56) References Cited

U.S. PATENT DOCUMENTS 3,286,799 A * 11/1966 Brian ............... F16D 65/12
188/218 R
4,445,951 A * 5/1984 Lind ............... D04H 3/12
428/102

(Continued)

OTHER PUBLICATIONS

EP 1238953 A1 (Year: 2002).*
JP 2006029369 A (Year: 2006).*

*Primary Examiner* — Robert A. Siconolfi
*Assistant Examiner* — Mahbubur Rashid
(74) *Attorney, Agent, or Firm* — Lorne Forsythe

(57) ABSTRACT

A method and system for increasing dampening capacity utilizing dry friction between individual wires of a rope embedded in a molded component formed from a composite. The individual wires allow inter-wire friction to occur during part vibration. The amount of inter-wire friction is controlled by the pressure when the component is molded. The component includes a body that is a molded matrix formed form a composite material. The body may be of any material selected from the group consisting of a polymer, a metal or a ceramic material. One or more vibration-dampening ropes are embedded in the body. The vibration-dampening ropes may be elongated segments or may be a rope having connected ends that form one or more rings. The vibration-dampening rope includes at least outer wires and can further include a plurality of inner wires surrounded by the outer wires. Composite material is prevented from passing through the outer wires, thereby forming voids between the wires.

20 Claims, 6 Drawing Sheets

Related U.S. Application Data continuation of application No. 15/671,878, filed on Aug. 8, 2017, now Pat. No. 10,495,175.

(51) Int. Cl.

| | | |
|---|---|---|
| *B29C 45/14* | (2006.01) | |
| *F16F 1/366* | (2006.01) | |
| *B29C 70/70* | (2006.01) | |
| *B29K 101/12* | (2006.01) | |
| *B29K 705/12* | (2006.01) | |
| *B29L 31/00* | (2006.01) | |
| *B29L 31/30* | (2006.01) | |

(52) U.S. Cl.
CPC .............. *B29C 70/70* (2013.01); *F16F 1/366* (2013.01); *F16F 15/02* (2013.01); *B29K 2101/12* (2013.01); *B29K 2705/12* (2013.01); *B29L 2031/30* (2013.01); *B29L 2031/721* (2013.01); *F16F 2222/04* (2013.01); *F16F 2224/0241* (2013.01)

(58) Field of Classification Search
CPC ............. F16F 15/022; B29C 45/14549; B29C 45/14631; B29C 70/70; B29K 2101/12; B29K 2705/12; B29L 2031/30; B29L 2031/721; F16L 55/027; F16L 55/02718; F16L 55/02709; F16L 55/02727; F16L 55/02754

See application file for complete search history.

(56) References Cited

U.S. PATENT DOCUMENTS

| | | | | |
|---|---|---|---|---|
| 5,824,923 | A * | 10/1998 | Kondoh | C22C 1/0425 419/33 |
| 7,975,750 | B2 * | 7/2011 | Dessouki | F16D 65/125 188/218 XL |
| 8,104,162 | B2 * | 1/2012 | Golden | F16F 15/16 29/527.1 |
| 8,465,241 | B2 * | 6/2013 | Gaw | B29C 70/70 411/908 |
| 2004/0242096 | A1 * | 12/2004 | Prakash | B32B 15/08 442/7 |
| 2010/0314210 | A1 * | 12/2010 | Amano | F16F 7/08 188/381 |
| 2016/0097433 | A1 * | 4/2016 | Karpenko | F16D 65/092 164/112 |

* cited by examiner

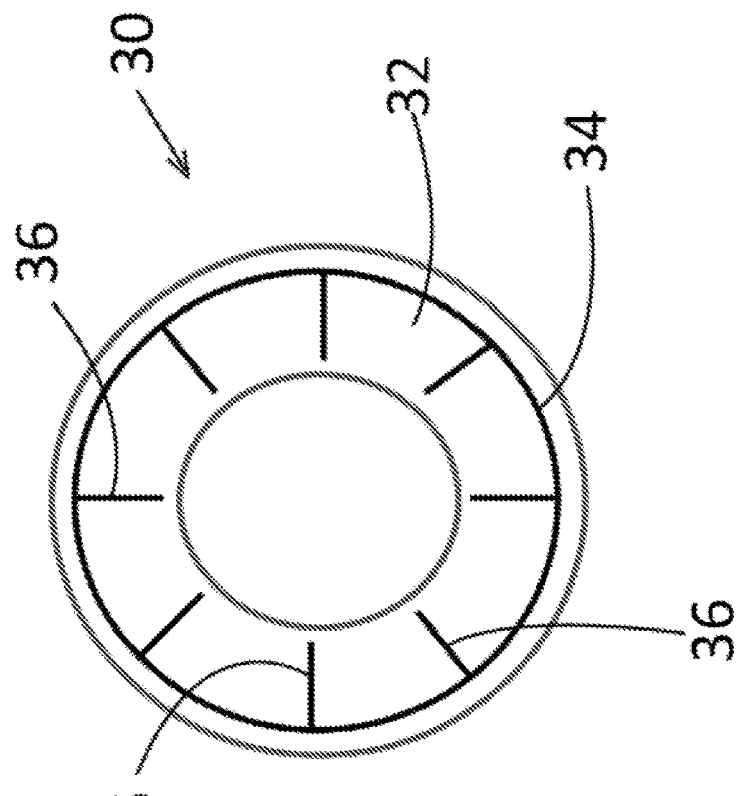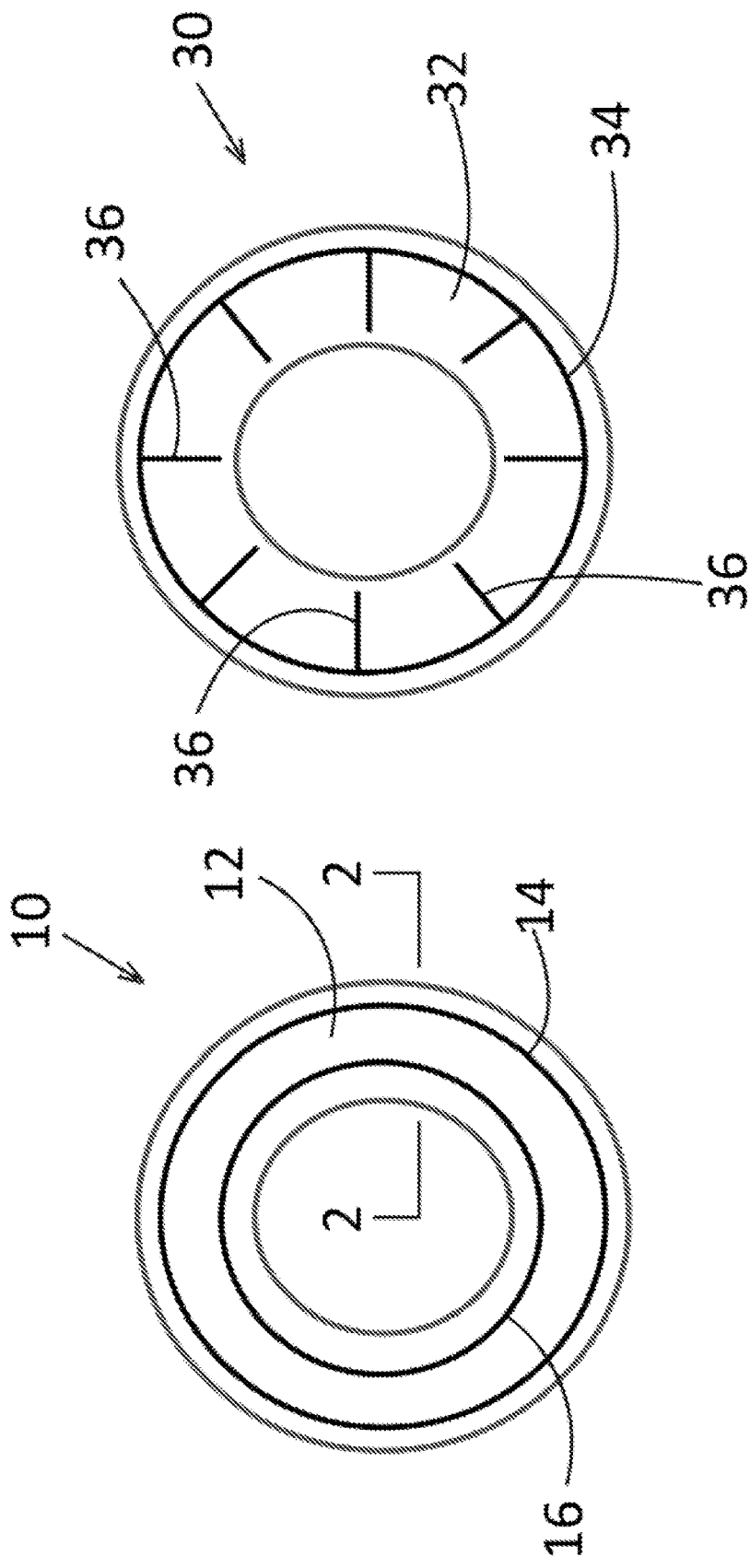

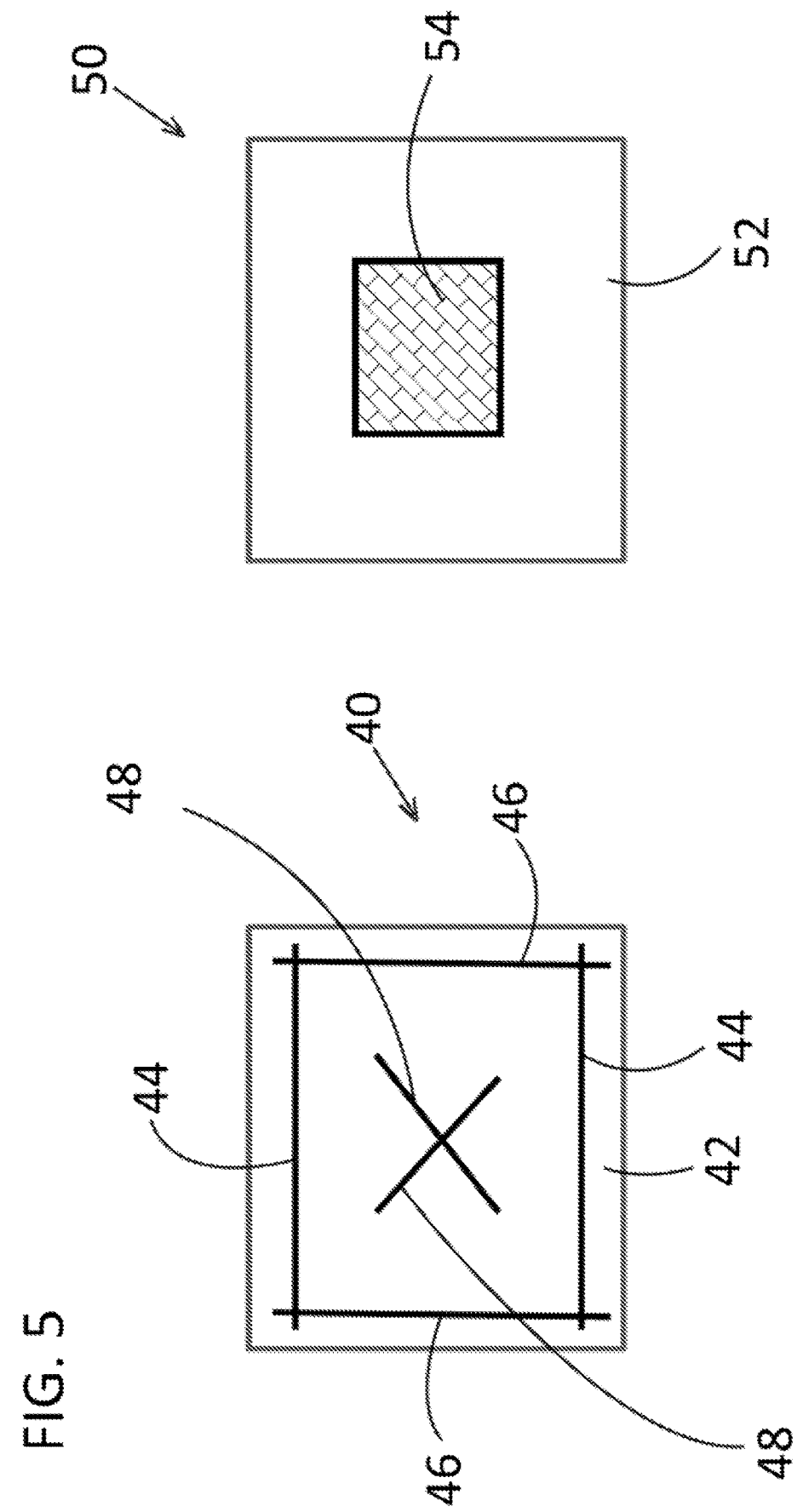

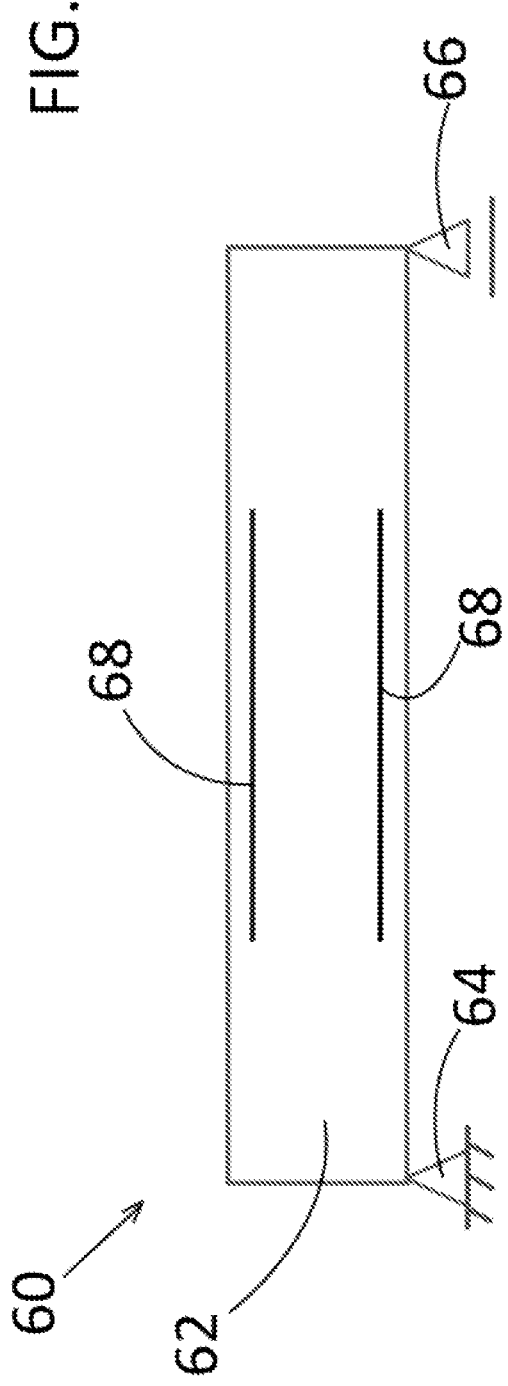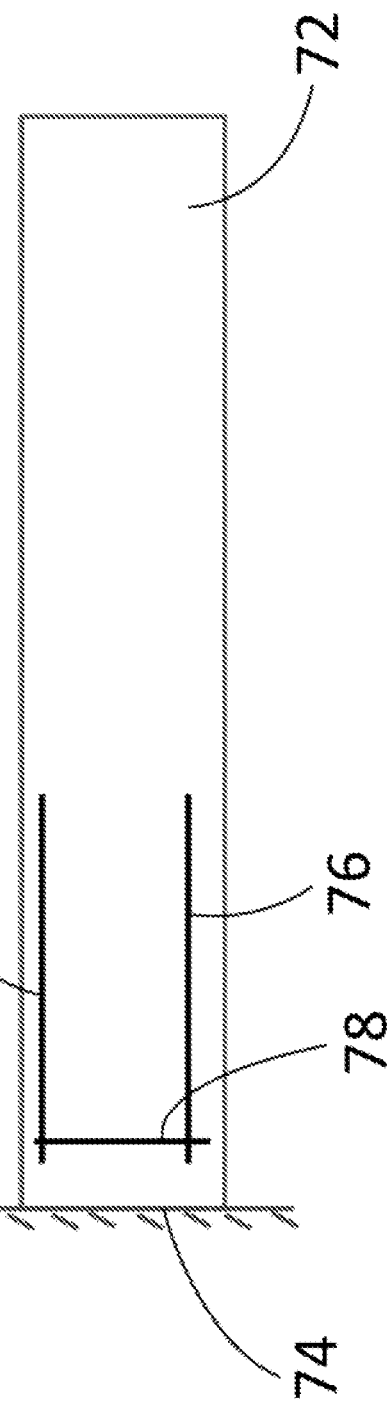

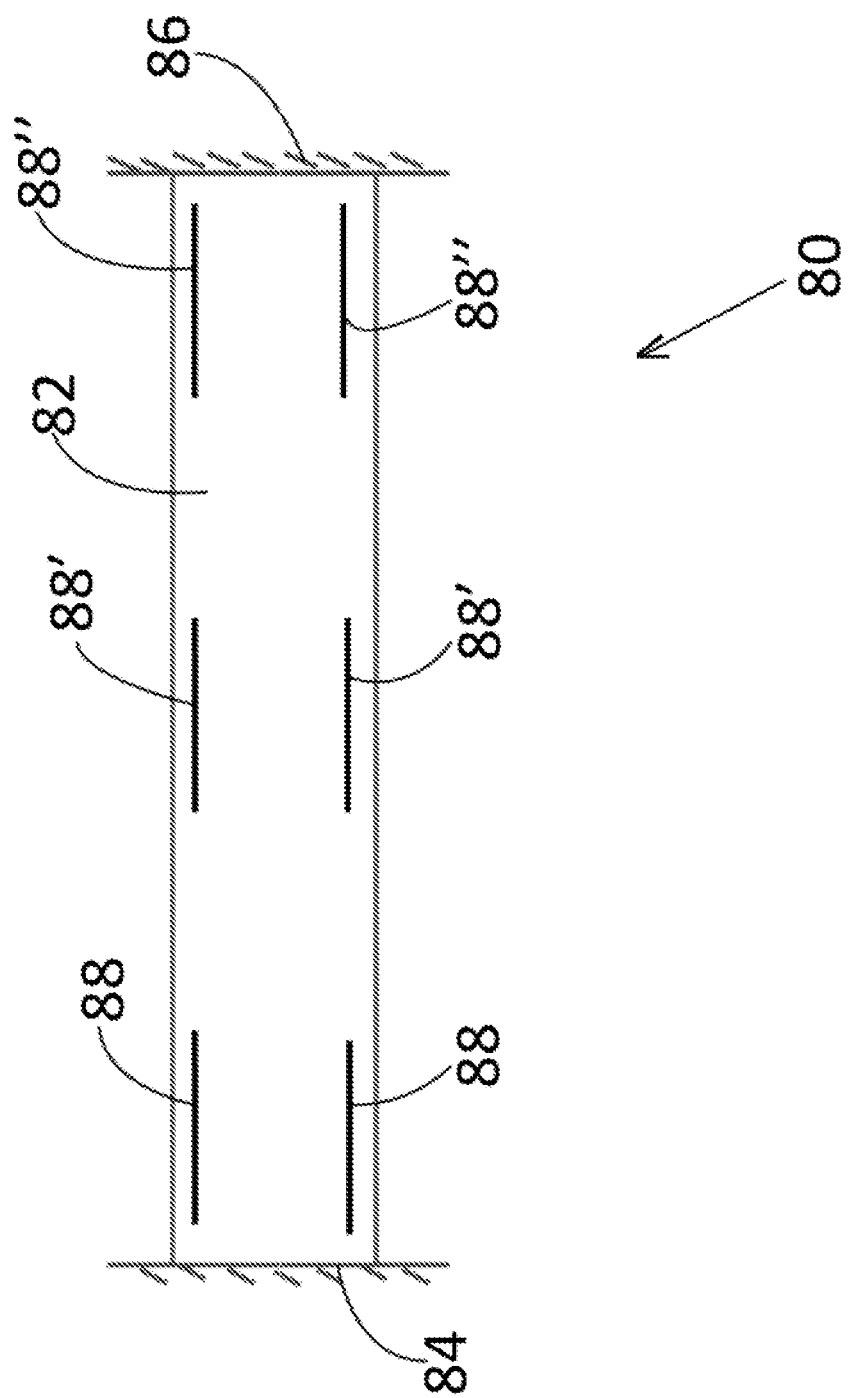

COMPOSITE MATERIALS HAVING EMBEDDED METAL CABLES OR ROPES FOR INCREASED DAMPENING CAPACITY AND METHODS OF MANUFACTURING SAME

RELATED APPLICATION

This application is a continuation-in-part of U.S. Non-Provisional application Ser. No. 16/702,426, filed Dec. 3, 2019, to which priority is claimed under 35 U.S.C. § 120 and of which the entire specification is hereby expressly incorporated by reference.

BACKGROUND

The present invention relates generally to components, such as vehicle components, made from composite materials. More particularly, the disclosed inventive concept relates to such components having metal cables or ropes embedded into the composite materials during a molding process. The vibration dampening capacity of the components is increased by providing such cables or ropes comprising plural individual wires that are either linear or twisted relative to one another and are embedded into the composite materials during the molding process.

Composite materials are used in a wide variety of applications, particularly in the automotive sector. Such applications include, for example, vehicle body panels as well as vehicle frame components. Newer wheel constructions include composite materials that are used as center elements which are attached to aluminum rims.

The composite materials used in such applications are made by combining two or more individual materials in both continuous and discontinuous forms to maximize their useful properties and to minimize their weaknesses. The material in the continuous form is called the matrix while the material in the discontinuous form is embedded (or dispersed) in the matrix. The embedded material is usually stronger than the surrounding matrix material, and thus is sometimes called reinforcing material.

Reinforcing materials are usually in the form of plates, fibers or particles that have random or preferred orientations within the matrix. The matrix binds the reinforcing materials together somewhat like an adhesive, thereby making the reinforcing materials more resistant to external damage. The reinforcing materials make the matrix stronger and stiffer and help the matrix resist cracking and fracturing. The reinforcing materials are typically glass, carbon, silicon carbide, or asbestos, while the matrix is usually a polymer, metal, or ceramic material.

The primary advantages of known composite materials are their net high strength, relatively low weight, and high degree of corrosion resistance. These advantages are the main reasons for the increasing use of composite materials in industrial applications in which the embedded component in a composite material has little if any exposure to dynamic loading such as shocks, impacts or repeated cyclic loading.

In view of the state of the art, it may be advantageous to provide composite components with appropriate molded-in components that aid in vibration dampening. As in so many areas of manufacturing technology, there is always room for improvement in vibration dampening by adding friction dampening to interacting mechanical and structural components.

BRIEF SUMMARY

According to various features, characteristics and embodiments of the present invention which will become apparent as the description thereof proceeds, the present invention provides a molded vibration-damped composite component that provides a predetermined resonant vibration dampening capacity, said vibration-damped composite component comprising:

a body formed from by molding a matrix material into a mold;

a rope embedded in the matrix material of the body by positioning the rope in the mold before the matrix material is molded into the body, said rope comprising a plurality of metal wires having outer wires that are in direct contact with the matrix material, whereby after molding an amount of dry friction developed by sliding movement of contact surfaces between said outer wires dampens resonant vibration of the component, and the amount of dry friction is controlled by adjusting the pressure in the mold during the molding process to produce the predetermined resonant vibration dampening capacity.

The present invention further provides a method of providing resonant vibration dampening in a molded component which method comprises:

providing a mold;

positioning a rope in the mold said rope comprising a plurality of metal wires, said wires including outer wires;

introducing a matrix material into the mold so as to embed said rope into the molded component, wherein after molding the outer wires can slide with respect to each other so that an amount of dry friction developed by sliding movement of contact surfaces between said outer wires dampens resonant vibration of the component; and adjusting the pressure in the mold at which the composite material is molded to control the amount of dry friction.

BRIEF DESCRIPTION OF THE DRAWINGS

The present invention will be described with reference to the attached drawings which are given as non-limiting examples only, in which:

FIG. 1 is a sectional view of a plate- or disk-shaped component formed from a composite material having one configuration of embedded metal ropes according to an embodiment of the disclosed inventive concept.

FIG. 4 is a sectional view of a plate- or disk-shaped component formed from a composite material having another configuration of embedded metal ropes according to an embodiment of the disclosed inventive concept.

FIG. 5 is a sectional view of a square- or rectangular-shaped component formed from a composite material having one configuration of embedded metal ropes according to an embodiment of the disclosed inventive concept.

FIG. 6 is a sectional view of a square- or rectangular-shaped component formed from a composite material having another configuration of embedded metal ropes according to an embodiment of the disclosed inventive concept.

FIG. 7 is sectional view of a pin-pinned beam structure formed from a composite material having embedded metal ropes according to the disclosed inventive concept.

FIG. 8 is sectional view of a cantilevered beam structure formed from a composite material having embedded metal ropes according to the disclosed inventive concept.

FIG. 9 is sectional view of a clamped-clamped beam structure formed from a composite material having embedded metal ropes according to the disclosed inventive concept.

DETAILED DESCRIPTION OF THE DRAWINGS AND THE PRESENTLY PREFERRED EMBODIMENTS

Figure 2:
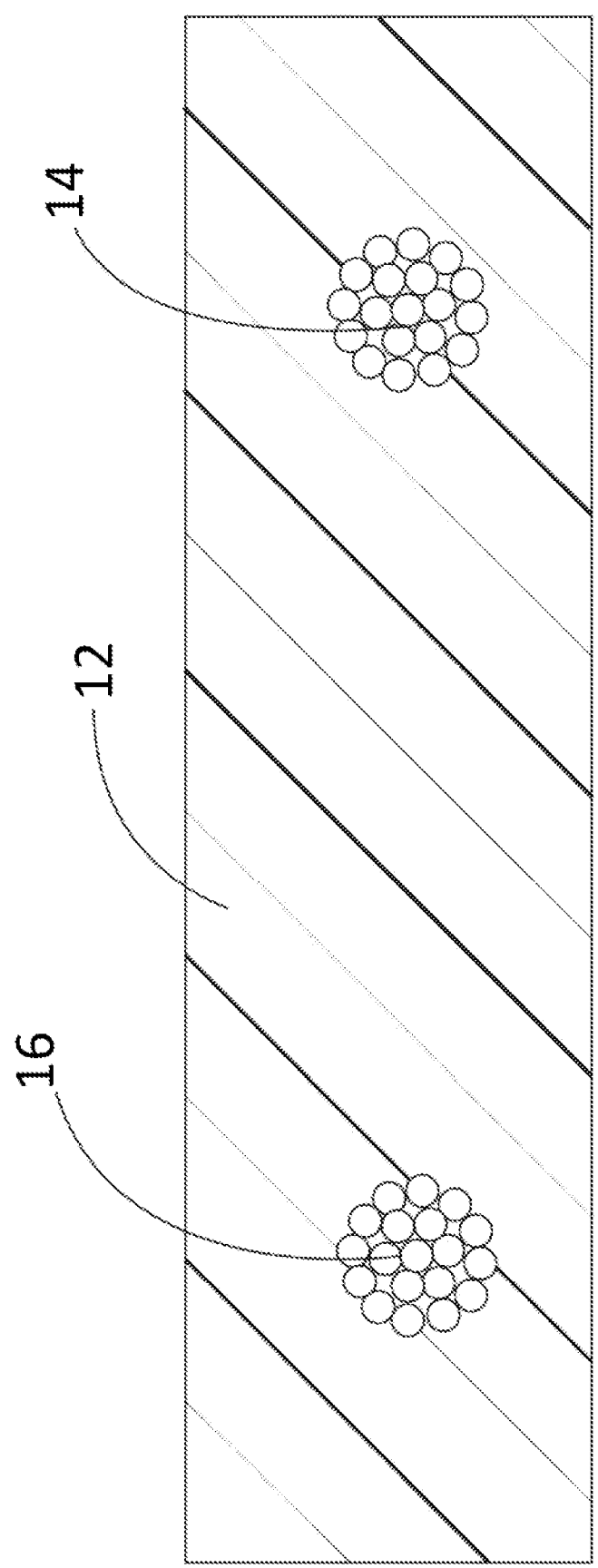
FIG. 2 is a cross-sectional view taken along plane 2-2 of FIG. 1.

The disclosed inventive concept provides a method and system for increasing vibration dampening capacity in components formed from composite materials by utilizing dry friction between individual wires of an embedded cable or rope. The cable or rope is embedded into the components during a molding process. The individual wires allow dry inter-wire friction to occur during component vibration. The strength of the individual wires is preferably higher than that of the surrounding composite matrix material, thereby increasing the amount of friction dampening that the inter-wire friction provides to the damped composite component.

The vibration-damped component according to the present invention includes a body that is a molded matrix formed form a composite material. The body may be of any material selected from the group consisting of a polymer, a metal or a ceramic material. One or more vibration-dampening cables or ropes are embedded in the body, having been placed in the component mold prior to introduction of the composite matrix material. The vibration-dampening cables or ropes may be elongated segments or may be cables or ropes having connected ends that form one or more rings or loops.

The vibration-dampening cables or ropes can include an outer layer of wires that surrounds a plurality of inner wires. Otherwise the vibration-dampening cables or ropes that only have outer wires can be used. The cable or rope is tightly bound such that when the vibration-damped component is molded, the inflowing composite matrix material is prevented from passing through the outer layer of wires to which it adheres and into the inner wires during the manufacturing process. Accordingly, the empty voids between the outer and inner wires are free of composite material, thereby allowing sliding movement of the outer and inner wires relative to one another causing dry friction that dampens resonant vibration of the component. Alternatively, when cables or ropes are used that only include outer wires that are bonded to the surrounding matrix material, stresses that occur in the matrix material due to dynamic loading are transferred to the outer wires causing micro slipping between the inner surfaces of the outer wires which produces vibration-dampening friction.

The examples of the possible configurations for the metal cables or ropes include but not limited to configurations in which: 1) individual wires of at least one metal cable or rope or of at least one bundle of woven metal cables or ropes are arranged in an entangled form (or in a random form); 2) individual cables or ropes and cable or rope bundles are combined in a mesh form or in an entangled form; 3) metal cables or ropes in the form of discrete segments of various lengths in random or specific pattern orientations; and 4) combinations of these configurations. In addition, the wire cables or ropes that are either in continuous form or in a discontinuous form (discrete segments) as well as in a combination of both can also be uniformly or non-uniformly distributed to create desired custom markings on the composite component exterior surfaces that would have a predetermined size and shape, e.g., a company logo.

The vibration-damped component may have any of a number of shapes, including without limitation disk-shaped, square-shaped or rectangular shaped. The component may also be selected from the group consisting of a beam, a plate, a solid body, a body having voids that are sealed from the environment, and a body having voids that are not sealed from the environment. Any such vibration-damped component may be adapted for any of several uses.

In FIGS. 1-9 the same reference numerals are used to refer to the same elements. In the following description, various operating parameters and components are described for different constructed embodiments. These specific parameters and components are included as examples and are not meant to be limiting.

The accompanying figures and the associated description describe the construction and use of vibration-dampening cables or ropes in composite materials according to the present invention. FIGS. 1-6 show the use of ropes embedded in several individual components for use in multiple applications, it being understood that either cables or ropes can be used. FIGS. 7-9 show the ropes embedded in a beam shown in multiple applications. It is to be understood that the configurations shown are suggestive only and are not intended as being limiting as other configurations may be adapted for use with the cables or ropes embedded in a composite material without deviating from either the spirit or scope of the present invention.

In each of the examples of the present invention presented herein and shown in the accompanying figures, the embedded ropes impart friction dampening in the composite material due to dry inter-wire friction. A localized introduction of Coulomb friction dampening into the structural components of the dynamic applications can be very effective in attenuating their resonant vibration. In general, the optimum location for a friction damper is the region of the structural component where it develops either the highest levels of vibration or of cyclic stresses. Thus, the use of the metal ropes only as a reinforcing material that is uniformly dispersed within the matrix while extending the use of composites to some dynamic applications takes advantage only of the metal high strength and the high stiffness which is not very cost effective for many mass production applications. Instead, the present invention takes full advantage of the use of vibration-dampening cables or ropes across a wide range of possible applications.

To reduce the sensitivity of composites to dynamic loading, the present invention increases their vibration dampening capacity. This is done by embedding metal cables or ropes (which, in general, are not straight) into the local regions of composite materials during molding process where the individual wires have relatively large surface areas and friction coefficients in the range from 0.2 to 0.4 (an optimal range for providing friction dampening). The increase in dampening performance of the resulting composite material is due to the dry, composite-free inter-wire friction within the embedded cables or ropes which develops between the surfaces of individual wires upon dynamic loading of the vibration-damped composite structure.

In order to improve the sensitivity of composite materials to dynamic loading, the present invention increases internal dampening of the material. The dampening capacity of composite materials is increased by utilizing Coulomb friction between individual wires of at least one metal cable or rope or of at least one bundle of woven metal cables or ropes in a mesh form or in an entangled form which are embedded into a composite material during the molding process. If desired, the metal cables or ropes can also be used in some combination of the individual cables or ropes and of the cable or rope bundles in a mesh form or in an entangled form. In each case, individual wires of metal cables or ropes can have a tensile strength of 201 MPa or higher. In order to improve bearing strength of composite materials, a localized region of the component which might be subjected to a concentrated load could be reinforced with additional individual metal wire cables or ropes or cable or wire ropes configured in the form of a mesh embedded into the composition material.

In order to avoid a negative impact of adding metal wire cables or ropes on the moldability of the composite material, the average diameter of the wire cables or ropes is limited to being only ten to one hundred times larger than that of any reinforcing fibers in the matrix material and their total weight percentage is restricted to be only 1%-5% of the overall mix weight. For metal wire cables or ropes in a mesh form, the dimensions of an opening of the mesh, a wire diameter and/or wire bundle diameter, respectively, can be optimized for a specific application during the development phase.

The dampening due to the inter-wire friction within the wire cables or ropes is introduced only at the composite structure areas that have relatively high vibration levels. Since, as a general matter, the distribution of the high vibration areas within any structure is non-uniform and is highly localized as noted above, the vibration-dampening cable or rope distribution within the composite structure is also localized and is non-uniform. This differs from the prior art in which cables or ropes were introduced into structures uniformly only in order to reinforce these structures. This was accomplished by providing a bond between all of the individual wires within the cables or ropes with the base material, thereby eliminating inter-wire friction inside the cables or ropes and, consequently, preventing friction dampening. Conversely, the present invention provides a solid bond between the base composite material and the vibration-dampening cable or rope surface only at its outer surface thereby allowing the inner wire surfaces to preserve their frictional contact.

FIG. 1 is a sectional view of a hypothetical plate- or disk-shaped component 10. As shown, the hypothetical plate-shaped component 10 includes a body 12 that is preferably formed from a thermoplastic polymer, although other matrix materials such as a metal or a ceramic material may be adopted for a specific use. Non-limiting examples of thermoplastic polymers include but are not limited to high-density polyethylene (HDPE) (if a rigid component having strength and durability is required), polyethylene, polypropylene, polyester and nylon or polyolefin-based polymer, a polystyrene-based polymer, a polycarbonate polymer, or mixture thereof.

At least one vibration-dampening cable or rope ring is embedded in the body 12. Each vibration-dampening rope is composed of a plurality of individual wires. The individual wires are preferably made of steel (having a friction coefficient of 0.3) although other metals may be selected for this use. The wires within the vibration-dampening rope may be made of the same metal or of different metals.

As shown, a pair of concentric vibration-dampening rope rings is embedded in the body 12 composed of a composite matrix. The pair includes an outer vibration-dampening rope ring 14 and an inner vibration-dampening rope ring 16. A greater or lesser number of vibration-dampening rope rings may be provided depending on the specific application.

FIG. 2 is a cross-sectional view of FIG. 1 taken along plane 2-2 and shows a more detailed view of the body 12 and the arrangement of the individual wires within the vibration-dampening outer rope ring 14 and the vibration-dampening inner rope ring 16. The spacing of the vibration-dampening outer rope ring 14 and the vibration-dampening inner rope ring 16 shown in FIG. 2 is only suggestive and is not intended as being limiting.

Figure 3:
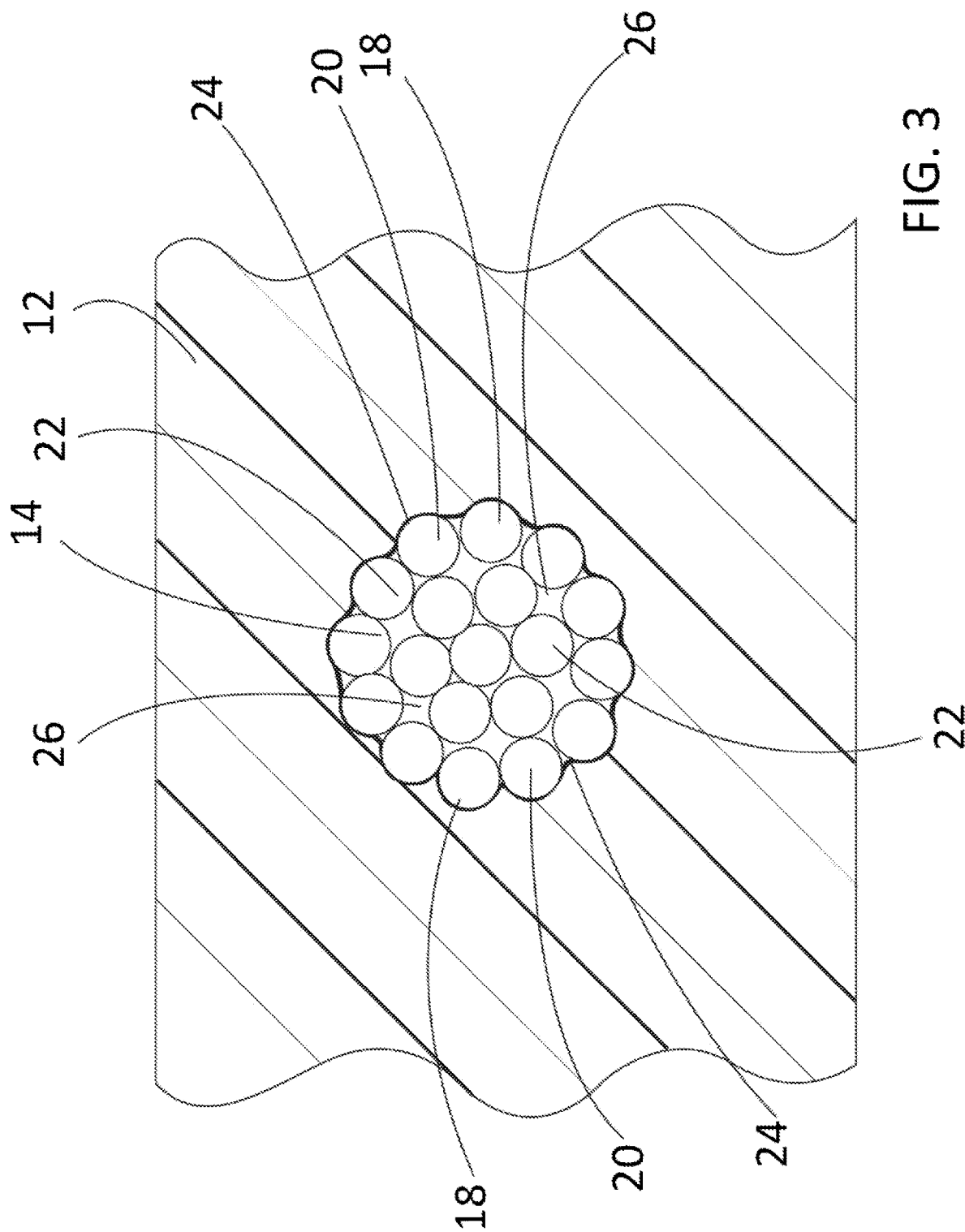
FIG. 3 is a close-up view of the rope embedded in the composite matrix according to the disclosed inventive concept.

An enlarged view of a vibration dampening rope 14 embedded in a composite matrix according to the present invention is shown in FIG. 3. The vibration-dampening rope 14 includes a plurality of individual wires 18. In general, the individual wires of the metal ropes can have an arbitrary cross section though a circular cross section is a preferred option due to a lower cost and availability. In each case, individual wires of metal ropes have a tensile strength of 201 MPa or higher.

The individual wires 18 include an outer layer of wires 20 and an inner group of wires 22. A composite matrix-rope interface 24 is formed between the composite matrix and the outer layer of individual wires 20, thereby leaving composite-free inter-wire spaces 26 between the inner group of wires 22 and between the inner group of wires 22 and the center-facing surfaces of the outer layer of wires 20.

The inflow of composite material through the outer layer of wires 20 is prevented by controlling the degree of tightness of the wrap of the rope. By wrapping at least the outer group of wires 20 tightly together during the production of the vibration-dampening rope 14, composite infiltration through the outer layer of wires 20 is restricted. In addition or as an alternative, the outer layer of wires 20 can be pre-treated with a protective coating using materials compatible with the base composite material thereby preventing composite infiltration during the molding process.

FIG. 4 is a sectional view of an alternate embodiment of a hypothetical plate- or disk-shaped component 30. The hypothetical plate-shaped component 30 includes a body 32 that is preferably formed from a thermoplastic polymer, although other matrix materials such as a metal or a ceramic material may be adopted for a specific use. The non-limiting examples of thermoplastic polymers noted above with respect to FIG. 1 may be utilized in the production of the hypothetical plate-shaped component 30.

At least one vibration-dampening rope ring 34 is embedded in the body 32. The shown embodiment provides the vibration-dampening rope ring 34 adjacent the outer periphery of the body 32. Extending inward from the vibration-dampening rope ring 34 toward the approximate center of the body 32 is a plurality of embedded elongated vibration-dampening rope segments 36 of which a greater or lesser number of segments may be provided. In addition, one or more additional vibration-dampening rope rings may be included. Like the vibration-dampening outer rope ring 14 and the vibration-dampening inner rope ring 16 of the hypothetical plate-shaped component 10, each of the vibration-dampening ropes 34 and 36 is composed of a plurality of individual wires.

FIG. 5 is a sectional view of a hypothetical rectangular-shaped component 40. The hypothetical rectangular-shaped component 40 includes a body 42 that is preferably formed from a thermoplastic polymer, although other matrix materials such as a metal or a ceramic material may be adopted for a specific use. The non-limiting examples of thermoplastic polymers noted above with respect to FIG. 1 may be utilized in the production of the hypothetical rectangular-shaped component 40.

A first pair of spaced apart, embedded and elongated parallel ropes 44 is provided adjacent the outer edge of the body 42. A second pair of spaced apart, embedded and elongated parallel ropes 46 is also provided adjacent the outer edge of the body 42. The spaced apart, embedded and elongated parallel ropes 44 are generally perpendicular to the spaced apart, embedded and elongated parallel ropes 46.

An intersecting set of ropes 48 is provided in the approximate center of the body 42. Like the vibration-dampening outer rope ring 14 and the vibration-dampening inner rope ring 16 of the hypothetical plate-shaped component 10, each of the vibration-dampening ropes 44, 46 and 48 is composed of a plurality of individual wires. A greater or lesser number of segments may be embedded. In addition, one or more additional vibration-dampening rope rings may be included.

FIG. 6 is a sectional view of another embodiment of a hypothetical rectangular-shaped component. The hypothetical rectangular-shaped component 50 includes a body 52 that is again preferably formed from a thermoplastic polymer, although other matrix materials such as a metal or a ceramic material may be adopted for a specific use. The non-limiting examples of thermoplastic polymers noted above with respect to FIG. 1 may be utilized in the production of the hypothetical rectangular-shaped component 50.

A centrally-provided array of woven ropes 54 is included in the body 52. Not shown but optionally provided are elongated ropes of the type shown in FIG. 5. Like the vibration-dampening outer rope ring 14 and the vibration-dampening inner rope ring 16 of the hypothetical plate-shaped component 10, each of the vibration-dampening ropes of the array of woven ropes 54 is composed of a plurality of individual wires.

In addition to providing vibration dampening for individual composite components as set forth above, the present invention may also provide vibration dampening in structural components such as beams for integral application with adjacent structures. Such composite beams having embedded vibration dampening ropes are shown in FIGS. 7-9 and are discussed in conjunction therewith. It is to be understood that the beam constructions and applications shown in these figures are illustrative only and are not intended as being limiting. Variations as to beam shape and size may be adopted together with the number, length and position of the embedded vibration-dampening ropes. In addition to the beam shown in FIGS. 7-9, the component may also be selected from the group consisting of a plate, a solid body, a body having voids that are sealed from the environment, and a body having voids that are not sealed from the environment. Any such component may be adapted for any of several uses.

FIG. 7 is a generalized example of a pin-pinned beam structure made of composite material and reinforced by vibration-dampening ropes according to the present invention. The pin-pinned beam structure, generally shown as 60, includes a body 62 composed of a composite material as discussed above. Illustratively, one end of the pin-pinned beam structure 60 may rest and pivot upon a point such as a fixed fulcrum 64. The other end of the pin-pinned beam structure 60 has a lifting point 66. The fixed fulcrum 64 is the pivot point by which the body 62 may be pivoted while the lifting point 66 provides a resting point when the body 62 is lowered.

The body 62 has embedded therein a pair of spaced apart and axially-aligned parallel elongated ropes 68. The inclusion of the parallel elongated ropes 68 provides both vibration dampening and added strength to the body 62. A greater or lesser number of ropes may be provided as needed for a specific application.

FIG. 8 is a generalized example of a cantilevered beam structure made of composite material and reinforced by vibration-dampening ropes according to an additional embodiment of the present invention. The cantilevered beam structure, generally shown as 70, includes a body 72 composed of a composite material as discussed above. Illustratively, one end of the cantilevered beam structure 70 is attached to a fixed structure 74 such as a frame structure on a vehicle.

The body 72 has embedded therein a pair of spaced apart and axially-aligned parallel elongated ropes 76 as well as at least one perpendicularly-aligned elongated rope 78. The inclusion of the parallel elongated ropes 76 and the perpendicularly-aligned elongated rope 78 provide both vibration dampening and added strength to the body 72. A greater or lesser number of ropes may be provided as needed for a specific application.

FIG. 9 is a generalized example of a clamped-clamped beam structure made of composite material and reinforced by vibration-dampening ropes according to a further embodiment of the present invention. The clamped-clamped beam structure, generally shown as 80, includes a body 82 composed of a composite material as discussed above. Illustratively, one end of the clamped-clamped beam structure 80 is attached to a first fixed structure 84 and the other end of the clamped-clamped beam structure 80 is attached to a second fixed structure 86. The fixed structures 84 and 86 may be any fixed structure such as fixed structures on a vehicle.

The body 82 has embedded therein a plurality of vibration-dampening rope segments. Particularly, three pairs of parallel and axially-aligned vibration-dampening rope segments 88, 88' and 88" are provided. The inclusion of the three vibration-dampening rope segments 88, 88' and 88" provide both vibration dampening and added strength to the body 82. A greater or lesser number of ropes may be provided as needed for a specific application.

Regardless of the component, the method of manufacturing the component having a vibration-dampening rope of the present invention follows a basic pattern. Initially, the outer surfaces of the wire ropes may be pre-treated with an adhesive if desired. The mold for the component is then opened and one or more vibration-dampening ropes are strategically placed in the mold. The vibration-dampening ropes may be circular, linear or both. Each vibration-dampening rope may have one or more insert locator tab attached thereto that extend beyond the outer periphery of the mold. The operator may rely on the tabs for proper positioning of the ropes within the mold during the molding process. The mold is then closed and the composite material is introduced into the mold. Once formed, the component is removed from the mold.

The outer surfaces of the wire ropes are thus solidly bonded to the matrix compound or the fiber surfaces that surround them in the part mold. At the same time, the inner wire surfaces inside the ropes remain to be in sliding frictional contact between themselves. Thus an increase in the dampening capacity of the resulting lightweight component is due to Coulomb friction developed at the contact interfaces between the surfaces of the individual inner wires inside the metal ropes when the component is subjected to dynamic loading. An additional advantageous feature is that the solid bonding between the outer surfaces of metal ropes and the matrix or the reinforcing material surfaces inside the component ensures its structural integrity.

As discussed herein, vibration dampening capacity of the components of the present invention is increased by providing cables or ropes comprising plural individual wires that are embedded in the matrix component of the composite materials. Vibration dampening capacity of the components is due to Coulomb friction developed at the contact interfaces between the surfaces of the individual inner wires inside the cables or ropes when the components are subjected to dynamic loading. In addition, since the outer wires that are bonded to the matrix material, stresses that occur in the matrix material due to dynamic loading are transferred to the outer wires causing micro slipping between the inner surfaces of the outer wires which produces vibration-dampening friction.

U.S. Pat. No. 9,841,072 of which the present inventor is a coinventor discloses how vibration dampening can be achieved by embedding ropes in composite material components in such a manner that the surface contact area between the individual wires is increased by increasing the number of wires and using wires that have different diameters.

The present invention is based upon the inventor's determining that the dampening capacity provided by cables or ropes is a function of both surface contact area between the individual wires and the pressure applied to the cables or ropes by the surrounding matrix material in the composites. Based on this discovery the present inventor has determined that by controlling the pressure within a mold as the matrix material is molded, the pressure exerted by the matrix material on the cables or ropes can be adjusted and thereby the amount of friction for a given amount of surface contact area (or number of wires) can be adjusted. Accordingly, the present invention molds composite vibration-dampening components using injection molding, compression molding or other molding processes in which the pressure in a mold during a molding process can be controlled to so that the matrix material applies a desired compression force on the wires within embedded cables or ropes to increase the friction created when the surfaces of the wires slide against each other. In the case of injecting a phenolic material such as DUREZ® 36567 into a mold cavity to produce a backing plate for auto brake pads a line pressure of 1 MPa with a +/−10% tolerance was found to produce a desired vibration dampening effect using an embedded rope having nineteen steel wires having a diameter of 0.8 mm. This pressure can be adjusted and varied depending on the number of wires in the embedded cables or ropes to produce a desired amount of dampening capacity. In this regard, since dampening capacity is function of surface contact area and pressure applied to the wires, the amount of pressure to produce a desired dampening capacity is inversely proportional to the number of wires being in surface contact with one another. In the present invention the minimum number of wires used in the embedded cables or ropes is three, all of which are bonded to the matrix material. The number of wires can range from three up to any number that does not cause the weight of the cables or ropes to exceed 1-5 wt. % of the composite component or otherwise jeopardize the structural integrity of the composite component. Using wires that have the same diameter has been determined to create the highest volume of closed voids where dry friction can be developed to dampen vibrations. Controlling molding pressures during injection and compression molding processes is within the skill of those familiar with these processes.

U.S. Pat. No. 9,841,072 is limited to teaching that dampening capacity is a function of the total surface contact area of the individual wires. Based upon this premise, the '072 patent teaches increasing the total surface contact area by forming a series of circular rings to increase the dampening capacity as shown in FIG. 7 in which wires having different diameters are packed closely together.

In the case of the present invention, since dampening capacity is determined by the amount of pressure exerted on the cables or ropes, dampening capacity is not strictly dependent on the amount of surface contact area based on the number of individual wires in a cable or rope or the number of circular rings of wires. Rather, according to the present invention, for a cable or rope having a set number of wires, the dampening capacity can be varied depending on the injection pressure of the matrix material in a mold when the composite component is molded.

As can be appreciated, the present invention allows for the use of cables or ropes having a fewer number of individual wires to provide a degree of dampening capacity that was previously provided by increasing the number of individual wires in a rope. Therefore, the present invention provides the advantage of using less wires thereby reducing the weight in the final component which is an ongoing goal in the automotive sector.

The number, diameter, and internal configuration (such as, but not limited to, linear or helical) of the wires may be adjusted as needed for a particular configuration. For example, the individual wires may be positioned linearly or helically. A greater or lesser number of wires may be incorporated. By adjusting the length and diameter of the individual vibration-dampening cables or ropes and by adjusting the number, diameter, and internal configuration of the wires, and the injection pressure during molding of component materials, the vibration-dampening capabilities of the cables or ropes according to the present invention may be virtually infinitely tuned for a broad variety of applications.

The composite component having one or more embedded vibration-dampening cables or ropes of the present invention has virtually unlimited applications and may be employed in any composite component regardless of shape and application. Because of the many conceivable variations of cable or rope length and diameter, it may be adapted for a virtually unlimited number of uses without compromising its dampening effectiveness. Accordingly, so as not to limit the broad use of the invention as a vibration dampener according to the present invention, the vibration-dampening rope of the present invention is shown in use in the hypothetical components shown herein.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A molded vibration-damped composite component that provides a predetermined resonant vibration dampening capacity, said vibration-damped composite component comprising:

a body formed from molding a matrix material into a mold;

a rope embedded in the matrix material of the body by positioning the rope in the mold before the matrix material is molded into the body, said rope comprising a plurality of metal wires having outer wires that are in direct contact with the matrix material, whereby after molding an amount of dry friction developed by sliding movement of contact surfaces between said outer wires dampens resonant vibration of the component, and the amount of dry friction is controlled by adjusting the pressure in the mold during the molding process to produce the predetermined resonant vibration dampening capacity.

2. A molded vibration-damped composite component according to claim 1, wherein the number of outer wires is three.

3. A molded vibration-damped composite component according to claim 1, wherein the rope further comprises inner wires, said inner wires being free of direct contact with the matrix material, whereby an amount of dry friction developed by sliding movement of contact surfaces between said inner wires and outer wires dampens resonance vibration in the component, and the amount of dry friction is controlled by adjusting the pressure in the mold during the molding process to produce the predetermined vibration dampening capacity.

4. A molded vibration-damped composite component according to claim 1, wherein the molded vibration-dampened composite component comprises an injected molded component.

5. A molded vibration-damped composite component according to claim 1, wherein the molded vibration-dampened composite component comprises a compression molded component.

6. A molded vibration-damped composite component according to claim 1, wherein the magnitude of the adjusted pressure in the mold is inversely proportional to the numbers of metal wires in the rope.

7. A molded vibration-damped composite component according to claim 1, wherein the matrix material comprises a thermoplastic polymer.

8. A molded vibration-damped composite component according to claim 1, wherein the molded vibration-damped composite component comprises a vehicle component.

9. A molded vibration-damped composite component according to claim 8, wherein the molded vibration-damped composition component comprises a brake component.

10. A molded vibration-damped composite component according to claim 1, wherein the rope has ends that are joined to form one or more of a ring or a loop.

11. A method of providing resonant vibration dampening in a molded component which method comprises:

providing a mold;

positioning a rope in the mold said rope comprising a plurality of metal wires, said wires including outer wires;

introducing a matrix material into the mold so as to embed said rope into the molded component, wherein after molding the outer wires can slide with respect to each other so that an amount of dry friction developed by sliding movement of contact surfaces between said outer wires dampens resonant vibration of the component; and adjusting the pressure in the mold at which the composite material is molded to control the amount of dry friction.

12. A method of providing resonant vibration dampening in a molded component according to claim 11, wherein the number of outer wires is three.

13. A method of providing resonant vibration dampening in a molded component according to claim 11, wherein the rope further comprises inner wires, said inner wires being free of direct contact with the matrix material, whereby an amount of dry friction developed by sliding movement of contact surfaces between said inner wires and outer wires dampens resonance vibration in the component, and controlling the amount of dry friction by adjusting the pressure in the mold during the molding process to produce a desired vibration dampening capacity.

14. A method of providing resonant vibration dampening in a molded component according to claim 11, wherein the molded vibration-dampened composite component comprises an injected molded component.

15. A method of providing resonant vibration dampening in a molded component according to claim 11, wherein the molded vibration-dampened composite component comprises a compression molded component.

16. A method of providing resonant vibration dampening in a molded component according to claim 11, wherein a magnitude of the adjusted pressure in the mold is inversely proportional to a number of metal wires in the rope.

17. A method of providing resonant vibration dampening in a molded component according to claim 11, wherein the matrix material comprises a thermoplastic polymer.

18. A method of providing resonant vibration dampening in a molded component according to claim 11, wherein the molded vibration-damped composite component comprises a vehicle component.

19. A method of providing resonant vibration dampening in a molded component according to claim 18, wherein the molded vibration-damped composition component comprises a brake component.

20. A method of providing resonant vibration dampening in a molded component according to claim 11, wherein the rope has ends that are joined to form one or more of a ring or a loop.

* * * * *